(12) United States Patent
Dumoulin et al.

(10) Patent No.: US 9,376,331 B2
(45) Date of Patent: Jun. 28, 2016

(54) INSTALLATION FOR WATER TREATMENT BY FLOTATION AND CORRESPONDING WATER TREATMENT METHOD

(71) Applicant: Veolia Water Solutions & Technologies Support, Saint-Maurice (FR)

(72) Inventors: Laurence Dumoulin, Charenton le Pont (FR); Delia Pastorelli, Fontenay sous Bois (FR); Michel Badard, Clamart (FR)

(73) Assignee: Veolia Water Solutions & Technologies Support, Saint Maurice (FR)

( * ) Notice: Subject to any disclaimer, the term of this patent is extended or adjusted under 35 U.S.C. 154(b) by 0 days.

(21) Appl. No.: 14/270,850

(22) Filed: May 6, 2014

(65) Prior Publication Data

US 2014/0326676 A1 Nov. 6, 2014

Related U.S. Application Data

(62) Division of application No. 12/600,591, filed as application No. PCT/EP2008/056057 on May 16, 2008, now Pat. No. 8,753,508.

(30) Foreign Application Priority Data

May 18, 2007 (FR) ...................... 07 03596

(51) Int. Cl.
*C02F 1/24* (2006.01)
*B03D 1/24* (2006.01)
*B03D 1/14* (2006.01)
*C02F 1/00* (2006.01)
*C02F 1/56* (2006.01)

(52) U.S. Cl.
CPC .............. *C02F 1/24* (2013.01); *B03D 1/1412* (2013.01); *B03D 1/1431* (2013.01); *B03D 1/1456* (2013.01); *B03D 1/1475* (2013.01); *B03D 1/1481* (2013.01); *B03D 1/1493* (2013.01); *B03D 1/24* (2013.01); *C02F 1/006* (2013.01); *C02F 1/56* (2013.01)

(58) Field of Classification Search
None
See application file for complete search history.

(56) References Cited

U.S. PATENT DOCUMENTS 7,445,709 B2 * 11/2008 Beaule et al. .............. 210/221.2

FOREIGN PATENT DOCUMENTS

WO WO 2005/035105 A1 * 4/2005

OTHER PUBLICATIONS

A South African Design Guide for Dissolved Air Flotation, pp. B26-B29, Haarhoff, J. and Vuuren, L. 1993, WRC Project No. 332. TT 60/93.*

*Primary Examiner* — Thomas M Lithgow
(74) *Attorney, Agent, or Firm* — Coats and Bennett PLLC (57) ABSTRACT

A system and process for treating water wherein water to be treated is directed to an inlet zone and from the inlet zone to a mixing zone. A flotation zone receives water from the mixing zone. A clarified water collection area is disposed adjacent the flotation zone for receiving clarified water from the flotation zone. There is provided one or more spray nozzles disposed in the mixing zone for injecting pressurized water into the mixing zone and generating air bubbles in the mixing zone such that the air bubbles are mixed with the water to be treated. A perforated plate separates the inlet zone and the mixing zone and includes an array of openings through which water to be treated passes as the water to be treated moves from the inlet zone to the mixing zone. The openings in the perforated plate give rise to a homogeneous mixture of the water to be treated and the air bubbles that result from the pressurized water being injected into the mixing zone by the one or more spray nozzles. Suspended matter and particulate in the water agglomerates around or with the air bubbles and the air bubbles carry the suspended matter and particulate to the surface of the water to be treated. Once the water and air bubbles reach the flotation zone, the air bubbles with the associated suspended matter and particulate can be removed from the surface of the water by a flotation process.

20 Claims, 5 Drawing Sheets

INSTALLATION FOR WATER TREATMENT BY FLOTATION AND CORRESPONDING WATER TREATMENT METHOD

This application is a divisional application of U.S. patent application Ser. No. 12/600,591 filed Mar. 16, 2010, which is a U.S. National Stage Application of PCT Application No. PCT/EP2008/056057, with an international filing date of 16 May 2008. Applicant claims priority based on French Patent Application No. 0703596 filed 18 May 2007. The subject matter of these applications is incorporated herein.

FIELD

The field of the invention is that of clarification installations for the treatment of water.

More precisely, the invention relates to installations for water clarification that use the flotation method.

PRIOR ART

Figure 1:
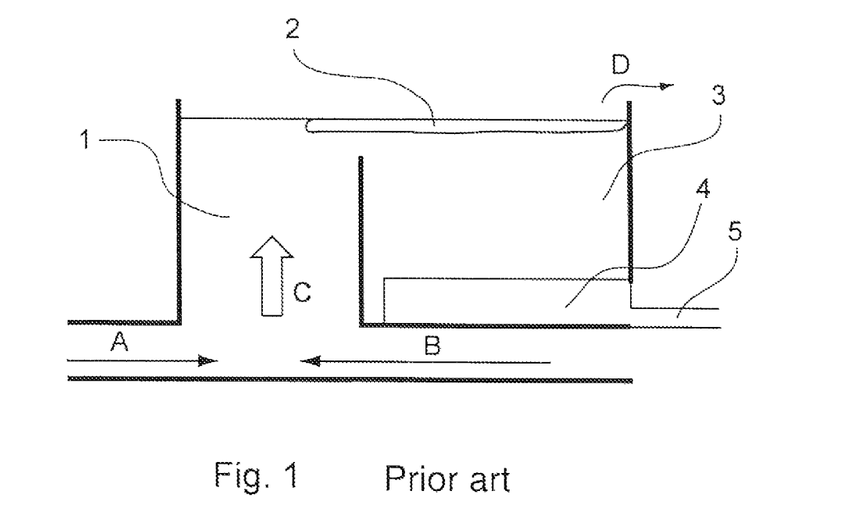
FIG. 1 shows an installation for water treatment according to prior art.

An installation for water clarification by flotation according to the prior art is shown in FIG. 1.

Such clarification installation comprises a coagulation, zone and a flocculation zone (not shown). In the coagulation zone, one or several coagulating agents (for example aluminium polychloride, aluminium sulfate, iron chloride, etc.) are injected into the water to be treated before the water is directed towards the flocculation zone.

Flocculation is a physical-chemical step which aims to modify the state of the colloidal particles in suspension in the water in such a way that the particles coagulate with one another.

Such as shown in FIG. 1, such an installation for clarification by flotation comprises a mixing zone 1 in the lower part wherein are admitted, in an ascending current, the water to be treated which is coagulated and flocculated beforehand (arrow A), and a pressurised and then depressurised water (arrow B) in such a way that micro air bubbles are formed. Such as shown by the arrow C, the air bubbles thus formed make it possible to bring towards the surface of the mixing zone all of the particles in suspension in the water to be treated agglomerated to the air bubbles. The mixture of particles agglomerated to the air bubbles forms a bed of bubbles 2 which extends at the surface of the mixing zone 1 and flotation zone 3.

These particles agglomerated to the air bubbles can then be removed (arrow D) in the upper part of the flotation zone 3.

The taking up of clarified water is carried out in the lower part of the flotation zone 3 for example by means of perforated piping 4 connected to conduits 5, or to any other means.

DISADVANTAGES OF PRIOR ART

A disadvantage, of this technique of prior art is linked to the design of the mixing zone. Indeed, this mixing zone does not allow for homogenous contact of the water to be treated, which is coagulated and flocculated beforehand, and of the pressurised and then depressurised water across the entire horizontal section of the mixing zone. This lack of homogenous contact is observed regardless of the value of the flow rate of the water to be treated, the quality of the water to be treated, and the value of the flow rate of the pressurised and then depressurised water.

Such a lack of homogenous contact generally results in disturbing the phenomenon of agglomeration of particles in suspension in the water to be treated with the micro air bubbles, which tends to reduce the effectiveness of the treatment of the water.

Another disadvantage of this technique of prior art is linked to the design of the flotation zone. Indeed, the matter in suspension agglomerated to the air bubbles is driven by a recirculation loop phenomenon, to the clarified-water take-up zone.

Such a phenomenon can therefore generate the departure of matter in suspension agglomerated to the micro bubbles into the flow of clarified water. Consequently, the clarified water collected contains impurities and the effectiveness of the device is therefore affected.

Furthermore, the bed of matter in suspension agglomerated to the air bubbles, which forms on the surface of the flotation zone, can reach a height close to the height of the flotation zone, which, associated with the recirculation phenomenon, favours the departure of impurities towards the clarified-water take-up zone.

Figure 2:
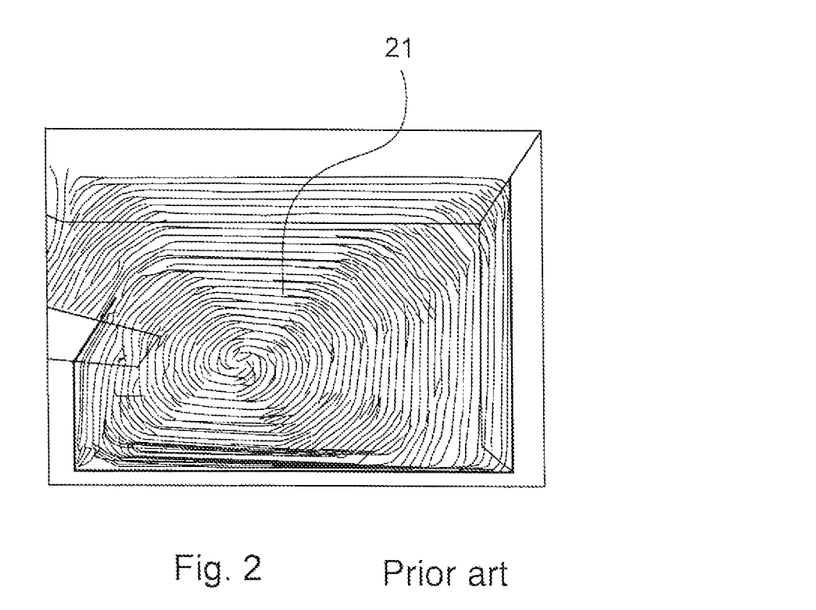
FIG. 2 shows the speed vectors of the flow of liquid inside the installation shown in FIG. 1.

This recirculation phenomenon is shown in FIG. 2 wherein are shown the speed vectors 21 of the flow of the water contained in the flotation zone are shown. It can be seen in this FIG. 2 that the clarified water has a tendency to rise towards the top of the flotation zone where the bed of air bubbles is located. The clarified water then mixes with the micro air bubbles loaded with particles initially in suspension in the water to be treated before being redirected towards the bottom of the flotation zone.

OBJECTIVES OF THE INVENTION

The invention in particular has for objective to overcome these disadvantages of prior art.

More precisely, an objective of the invention is to provide a technique for treating water that makes in possible to optimise the clarification of water by flotation.

Another objective of the invention is to provide a technique for the clarification of water by flotation which makes it possible to obtain a homogenous mixture of the water to be treated and of the pressurised and then depressurised water.

The invention also has for objective to implement such a technique which makes it possible to prevent the appearance of recirculation phenomenon in the clarified-water take-up zone.

Another objective of the invention is to provide such a technique that is reliable, simple and inexpensive to implement.

DESCRIPTION OF THE INVENTION

The invention relates to an installation for water treatment by flotation comprising at least:
  one inlet zone of the water to be treated which is coagulated and flocculated beforehand;
  one mixing zone of a pressurised and then depressurised water with said water to be treated;
  one flotation zone separated from said mixing zone by a wall;
  one clarified-water take-up zone provided in the lower part of said flotation zone.

According to the invention, said mixing zone accommodates at least one spray nozzle of said pressurised water, said spray nozzle extending in the vicinity of a panel, of which at least one portion has perforations, and which separates said inlet zone and said mixing zone.

Thus, the invention consists in interposing a perforated panel between the inlet zone of the water to be treated and the mixing zone. The passage of the water to be treated through the perforated panel makes it possible to homogenise and to fragment the flow of the water to be treated. This contributes to homogenize the contact between the water to be treated and the micro air bubbles formed in the mixing zone by the introduction of pressurised and then depressurised water over the entire horizontal section of the mixing zone, which makes it possible to improve the agglomeration of particles in suspension in the water to be treated with the micro air bubbles.

The invention makes it possible, moreover, to neutralise the hydraulic short circuits, responsible for a loss in effectiveness by the lack of contact between particles in suspension and air bubbles.

The implementation of such a perforated panel according to the invention therefore makes it possible to optimise the treatment of the water by flotation and to consequently improve the quality of the clarified water collected at the end of the treatment.

According to an advantageous characteristic, said panel extends substantially horizontally.

In this case, the flow of water to be treated is substantially ascending downstream of the panel. If the flocs formed during the coagulation/flocculation are resistant, the pressurised water is preferentially sprayed counter-current to the water to be treated. The spray nozzles then extend substantially vertically in such a way that the pressurised water is sprayed according to an initially descending current.

If the flocs formed are fragile, the nozzles are placed in such a way that the pressurised water is sprayed co-current to the water to be treated, i.e. in such a way that the pressurised water is sprayed according to an initially ascending current.

According to another advantageous characteristic, said panel extends substantially vertically.

In this case, the spray nozzles extend substantially horizontally in such a way that the pressurised water is sprayed according to an initially horizontal current. Only the direction of the spray is different (co-current or counter-current) according to whether the flocs are fragile or resistant.

In other advantageous alternatives, it can be provided that the panel be inclined.

According to a preferred embodiment, a water treatment installation according to the invention comprises a plate forming a splash board substantially parallel to said panel that extends between said panel and said nozzle and of which at least one portion has first holes.

The implementation of such a plate forming a splash board makes it possible to improve the fragmentation of the flow of water to be treated and thus to homogenise the contact between the micro air bubbles and the water to be treated in the mixing zone.

Preferentially, said first holes of said plate extend in the extension of solid parts of said panel.

This allows for the creation of baffles that must be crossed by the water to be treated before it arrives in the mixing zone. The presence of these baffles also makes it possible to improve the fragmentation of the flow of the water to be treated.

Advantageously, said plate has second holes which extend above said perforations of said panel.

These second holes, also called holes or refining holes, make it possible to optimise the homogenisation of the flow of water to be treated.

According to a preferred aspect of the technique shown here, each one of said spray nozzles is placed substantially in the axis of one of said perforations of said panel.

This makes it possible to obtain an optimal mixture between the flows of water to be treated and pressurised water. However, according to an alternative wherein the perforations of the panel have a relatively small size, the correspondence between each spray nozzle and a perforation of the panel is not required in order to obtain a satisfactory mixture.

Advantageously, a water treatment installation according to the invention comprises a first and a second distribution network of said pressurised water respectively according to two different distribution flow rate values.

This approach can make it possible to spray pressurised water according to a flow rate Q1 delivered by the first network, according to a flow rate Q2 delivered by the second network, and according to a flow rate Q3 equal to the sum of flow rates Q1 and Q2 when the two networks are activated simultaneously. The flow rate can be chosen for example according to the flow of water to be treated and/or according to its quality. According to an advantageous characteristic, said nozzle is connected to said first and second distribution networks.

Such nozzles, also called, double nozzles, due to the fact that they are connected directly to the two networks, can also be used when the plate forming a splash board is or is not implemented. Their use is however recommended when the plate forming a splash board is not implemented, and each of the nozzles extends in the axis of the perforations of the panel.

According to an alternative, said nozzles belong advantageously to two categories of nozzles, a first category of nozzles being connected to said first network and a second category of nozzles being connected to said second network.

Such spray nozzles can be used preferentially when the plate forming a splash board is implemented, or when the perforations of the panel have a diameter of small size, advantageously between two and thirty centimeters.

According to an advantageous characteristic, said nozzle (s) include two perforated plates arranged across from one another.

These nozzles include therefore two perforated walls, also called pressure-reducing walls, which make it possible respectively to subject the pressurised water to a first strong pressure reduction then a second low pressure reduction making it possible to spray water accompanied with micro air bubbles. The spraying furthermore makes it possible to prevent strong shear rates on the spraying stage.

According to a preferred characteristic, said nozzles have a lower divergent outline.

The implementation of a lower divergent outline can in particular make it possible to render the spraying phenomenon reliable.

Advantageously, said divergent outline is flat and forms an angle $\lambda$ with the vertical between 0 and 20°.

Preferentially, said divergent outline is curved.

According to a preferred aspect of the invention, the upper part of said wall separating said mixing zone from said flotation zone has a portion inclined according to an angle $\alpha$ in the direction of said flotation zone.

In this case, the value of said angle $\alpha$ is advantageously between 120° and 175°.

According to another advantageous aspect, said wall separating said mixing zone of said flotation zone has an upper portion curved in the direction of said flotation zone.

In this case, said curved portion has preferentially a radius between 0.1 and 1 meter.

The implementation of such inclined or carved portions can in particular make it possible to facilitate the passage of the water from the mixing zone towards the flotation zone.

Advantageously, said flotation zone, accommodates a plurality of partitions extending substantially vertically above said take-up zone.

The implementation of such partitions makes it possible to fragment the clarified water which flows towards the bottom of the flotation zone and as such to prevent the appearance of the recirculation loop phenomenon. This participates in preventing the clarified water from mixing with the bed of air bubbles whereon are agglomerated particles initially contained in the water to be treated.

Preferentially, at least one of said partitions has at least one upper part inclined according to an angle β or curved.

Preferentially the angle β has a value between 120° and 240°.

These inclined or curved portions can snake it possible to improve the recirculation breakage in the clarified-water take-up zone.

Advantageously, said partitions have a height between 30 and 300 centimeters. According to another preferred aspect of the invention, said partitions are closer to one another in the vicinity of said wall separating said mixing zone from said flotation zone.

This can in particular contribute to preventing the formation of induced rotations of the flow between two plates.

Preferably, said partitions are separated by a distance between 20 and 300 centimeters.

Preferentially, said take-up zone accommodates means for taking up clarified water connected to means of collecting clarified water.

According to an advantageous aspect, a water treatment installation according to the invention comprises means for producing said pressurised water.

Preferentially, said means for producing are connected to said means for taking up clarified water and to a source of air production.

The pressurised water can thus be formed using clarified water available at the outlet of the installation according to the technique shown here. In an alternative, the pressurised water can also be formed using water to be treated that is more preferably non-coagulated and non-flocculated.

Advantageously, a water treatment installation according to the invention comprises scraping means able to be displaced across from the upper part of said flotation zone.

These scraping means make it possible to remove the beds of air bubbles simply and effectively.

The invention also relates to a flotation water treatment method by flotation which consists in transiting the water into an installation according to the technique shown here, and in admitting into said mixing zone an ascending current of said water to be treated through said perforated panel, and a current of said pressurised water by means of said spray nozzle(s) in such a way as to form air bubbles able to bring particles in suspension in said water to be treated towards the surface of said mixing zone.

According to a preferred aspect, said current of said pressurised water is initially ascending.

According to another preferred aspect, said current of said pressurised water is initially descending.

According to yet another preferred aspect of the technique shown here, said current of said pressurised water is initially horizontal.

Indeed, according to the quality of the water to be treated, more or less resistant flocs can be formed during coagulation-flocculation. The way the nozzle is provided depends on the resistance of the flocs. If the floc is fragile, the co-current is favoured to create a sufficient required shear rate. In the case where the coagulation-flocculation forms highly-resistant flocs, the counter-current is favoured.

Thus, according to whether the panel extends substantially horizontally or vertically, and that the flocs are fragile or resistant, the nozzles can be positioned in such a way that the pressurised water is sprayed co-current or counter-current to the water to be treated.

In another alternative, the nozzles can also be installed substantially horizontally when the panel extends substantially horizontally.

Advantageously, a water treatment method by flotation according to the invention comprises a step of choosing one of said values of said flow rate of distribution of said pressurised water according to the flow rate of said water to be treated and/or of the quality of said water no be treated.

A method according to the invention can therefore be modulated due to the fact that it can be adapted to a large number of situations.

According to another advantageous aspect, a water treatment method by flotation according to the invention consists in implementing said scraping means in order to remove outside of said flotation zone said particles agglomerated to said air bubbles.

LIST OF FIGURES

Outer characteristics and advantages of the invention shall appear more clearly when reading the following description of preferred embodiments, provided only for the purposes of information and in a non-limiting manner, and the annexed drawings, among which:

FIGS. 5 and 6A show two architectures of a distribution network of pressurised water implementing nozzles such as shown in FIG. 5;

DESCRIPTION OF EMBODIMENTS OF THE TECHNIQUE SHOWN HERE

Brief Reminder of the Principle of the Technique Shown Here

The main principle of the invention is based on the implementation of an installation for water clarification by flotation, which comprises a perforated panel that separates an inlet zone of water to be treated which is coagulated and flocculated beforehand from a mixing zone of the water to be treated with a pressurised and then depressurised water, the mixing zone containing one or several spray nozzles of the pressurised water.

The presence of the perforated panel makes it possible to homogenise and to fragment the flow in the mixing zone of the water to be treated. This fragmentation makes it possible to homogenise the contact between the water to be treated and the micro air bubbles formed in the mixing zone across the entire horizontal section of the mixing zone. The implementation of such a perforated panel makes it thus possible to optimise the clarification of the water by flotation.

Furthermore, the installation according to the invention further comprises a flotation zone accommodating partitions spaced apart from one another and which extend substantially vertically and in parallel in relation to one another.

The implementation of such partitions inside the flotation zone makes it possible to break the lines of the flow of liquid flowing in the flotation zone. This makes it possible to prevent the recirculation phenomenon in particular in the lower part of the flotation zone, i.e. the clarified water from returning in contact with the bed of bubbles to the surface of the flotation zone. The driving of particles in suspension agglomerated to the air bubbles in the clarified-water take-up zone can thus be prevented, or at least limited.

The implementation of such partitions contributes to preventing air bubbles from being removed with the clarified water collected, and to consequently improve the quality of the clarified water collected.

Figure 3:
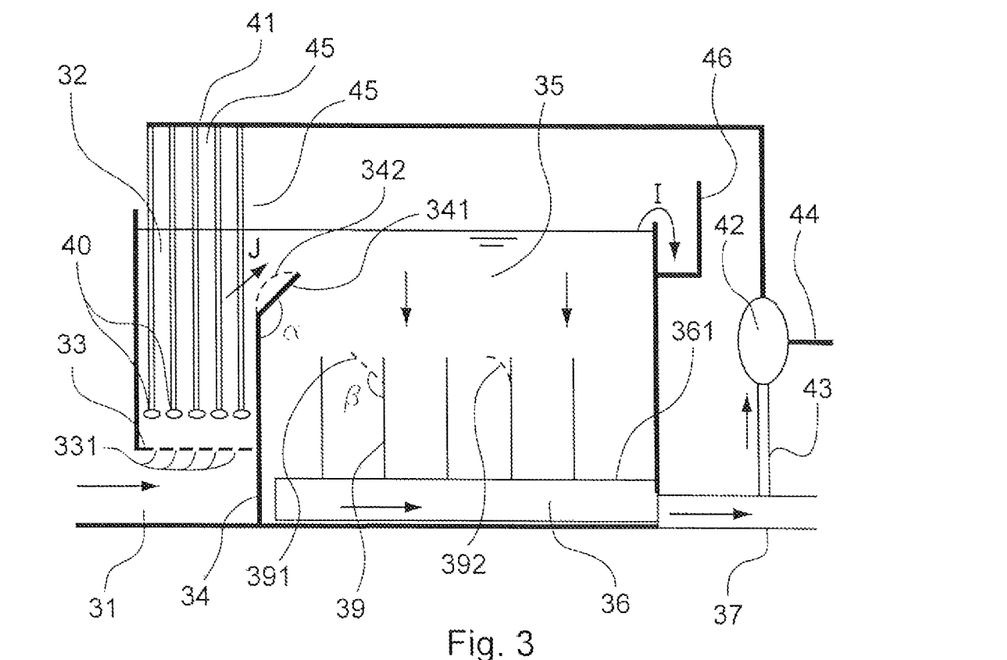
FIG. 3 shows a first embodiment of an installation for water treatment according to the technique shown here, wherein a perforated panel separates the inlet zone of the water to be treated from the mixing zone.

Example of a First Embodiment of a Water Treatment Plant According to the Technique Shown Here In reference to FIG. 3, an embodiment of an example of an installation for water treatment by flotation according to the invention is described.

Such an installation comprises an inlet zone 31 of water to be treated. The water to be treated is coagulated and flocculated beforehand. To this effect, a coagulation zone and a flocculation zone are arranged in series (not shown) upstream of the inlet zone 31.

A mixing zone 32 extends above the inlet zone of water 31. The water inlet 31 and mixing 32 zones are separated from one another by a panel 33 of which at least one portion has perforations 331. Preferentially, the perforations 331 extend over the entire surface of the perforated panel 33. The perforations 331 arranged in the panel 33 can for example have a circular outline of a magnitude of 15 centimeters in diameter. In other embodiments, the diameter of the perforations 331 can be different. The diameter can advantageously be between 2 and 50 centimeters.

A wall 34 separates the water inlet zones 31 and mixing zones 32 from a flotation zone 35. This wall 34 is substantially vertical in its lower part and has in its upper part a portion inclined 341 according to an angle α in the direction of the flotation zone 35. The value of this angle α is advantageously between 120° and 175°. The implementation of this inclined portion 341 makes it possible in particular to facilitate the passage of the water from the mixing zone towards the flotation zone.

In an alternative of the technique shown here, the inclined portion 341 can be replaced by a curved portion 342 (shown as a dashed line in FIG. 3) of which the radius can be between 0.1 and 1 meter.

Such a water treatment installation, according to the technique shown here also comprises means for taking up clarified water. These water take-up means include a chamber 36 of which the upper face 361 is perforated over at least one portion of its surface in such a way to allow the clarified water to penetrate therein. Moreover, the chamber 36 is connected to a conduit 37 which extends outside of the flotation zone 35 in the direction of a spillway (not shown), or any other means, which makes it possible to collect the clarified water obtained after the flotation treatment.

In an alternative of the technique shown here, the perforated chamber 36 can be replaced by perforated piping housed in the lower part of the flotation zone 35.

Vertical partitions 39 extend transversally and substantially vertically in the flotation zone 35. The height of these partitions 39 can be between 30 and 300 centimeters. These partitions 39 are solid and can be arranged at regular intervals or not. They can for example be spaced at a distance between 30 and 300 centimeters.

Figure 10:
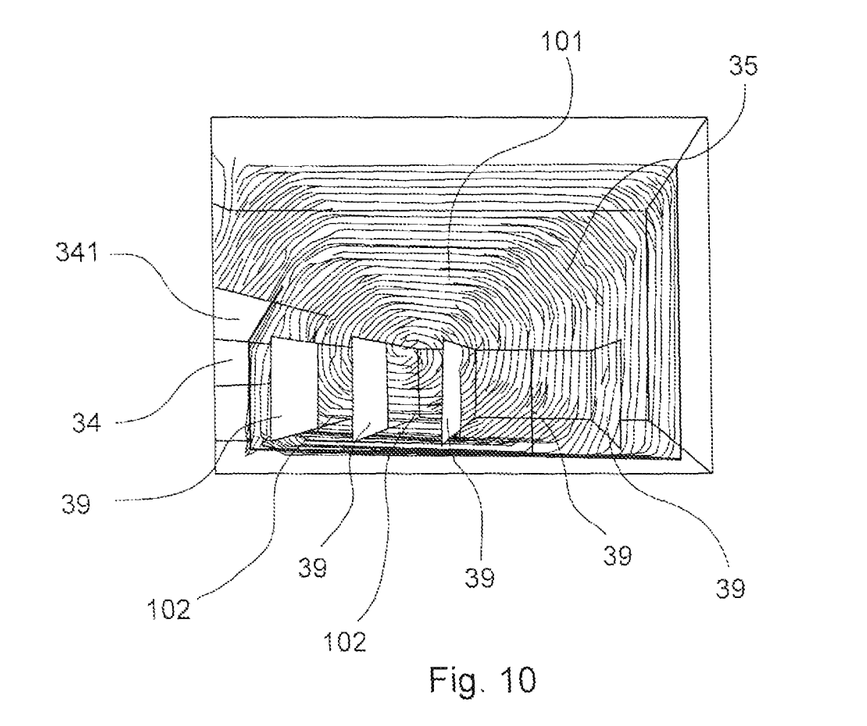
FIG. 10 shows the speed vectors of the flow of liquid inside an installation according to the technique shown here.

Preferentially, the closer the partitions 39 are to the wall 34, the smaller the separating distance is. This makes it possible to prevent the appearance of induced rotations 102 of fluid between two plates 39 as is shown in FIG. 10.

In other embodiments, the partitions 39 can be perforated. This in particular has the advantage of improving the distribution of the clarified water over the entire horizontal surface of the clarified-water take-up zone. Moreover, it can be provided that these partitions 39 be removable in particular in such a way to facilitate the maintenance of the device according to the technique shown here. Furthermore, these partitions 39 are preferentially made of steel of the stainless type. In alternatives, they can be made of materials of the plastic type. This can be particularly advantageous when treating sea water.

In alternatives of the technique shown here, the partitions 39 can also have a portion 391 that is inclined in relation to the vertical of an angle β of which value can be between 120 and 240° such as is shown as a dashed line in FIG. 3. They can also be inclined over their entire length. In another alternative, the partitions 39 can have a curved portion 392 (shown as a dashed line) in the direction of the wall 34 or not. The implementation of these inclined 391 or curved 392 portions mates it possible to improve the recirculation breakage in the clarified-water take-up zone.

Moreover, the mixing zone 32 accommodates at least one spray nozzle 40 of a pressurised water, placed in the vicinity of the perforated panel 33.

In this embodiment, nozzles 40 are placed in the axis of each perforation 331 of the panel 33 as is shown in FIG. 3. The diameter of the perforations 331 preferentially ranges between 5 and 50 centimeters. This makes it possible to provide an optimal mixture between the flows of water to be treated and pressurised water.

Figure 4:
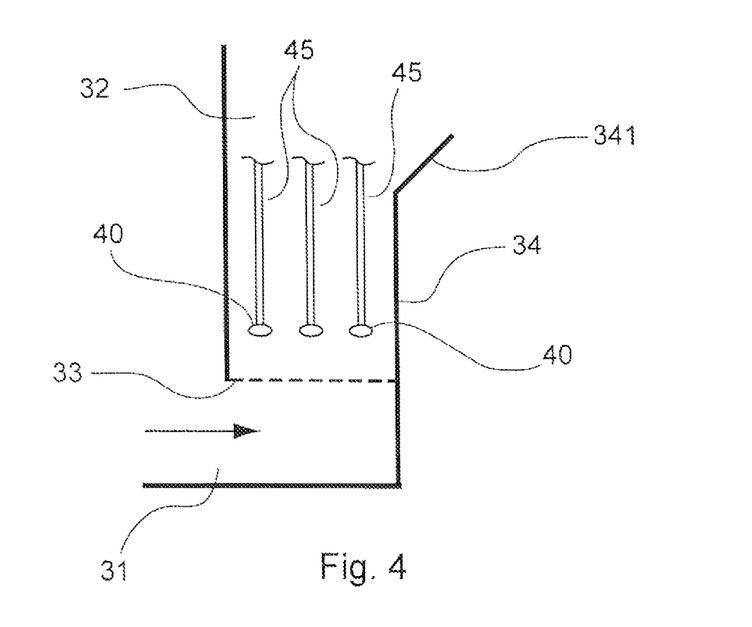
FIG. 4 snows a partial view of an alternative of the installation in FIG. 3 wherein several spray nozzles are implemented without correspondence with the perforations of the perforated panel.

However, in an alternative of this embodiment wherein the perforations 331 arranged in the perforated panel 33 have a small diameter, advantageously between 2 and 30 centimeters, the correspondence between each nozzle and a perforation 331 is not required as shown in FIG. 4.

As shall be explained in more detail in what follows, these spray nozzles 40 mate it possible to generate an initially descending current of pressurised and then depressurised water in the mixing chamber 32. In this case, the pressurised water is sprayed in the mixing chamber 32 at counter-current in relation to the water to be treated.

In an alternative of this embodiment, the spray nozzle(s) 40 can be arranged in such a way to generate an initially ascending current of pressurised water inside the mixing zone. In this case, the pressurised water is sprayed in the mixing chamber at co-current in relation to the water to be treated.

These spray nozzles 40 are connected to means of producing pressurised water 42 by the intermediary of pipes 41. The means of producing pressurised water 42 are connected to a pressurisation balloon (not shown) provided with one or several aeroejectors which provide the air-water mixture. These means of producing pressurised water are connected on the one hand to the conduit 37 wherein clarified water flows by a tube 43, and on the other hand to a source of air production 44. The pressurised water, of which the pressure is advantageously between 3 and 8 bars, is thus produced using a portion of the clarified water collected and air.

As shall be explained in more detail in what follows, several means of producing pressurised water can be placed in parallel in such a way to allow for the spraying of the pressurised water according to different rates.

Figure 5:
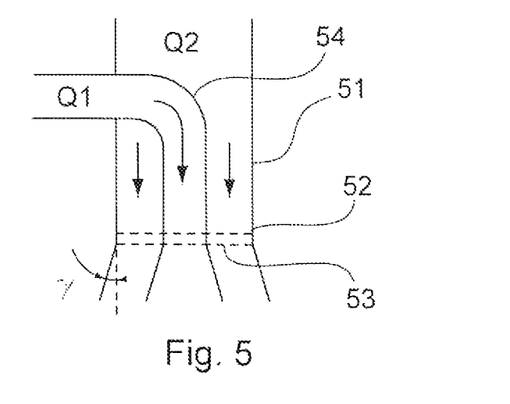
FIG. 5 is a schematic view of a spray nozzle able to be connected to two spray networks of pressurised water according to different rates.

In relation with FIG. 5 an example of spray nozzle 40 is described.

Note that the operating principle of these spray nozzles 40, which consists of a double pressure reduction, is similar to that of sprayers of the WRC type. However, and such as shall appear more clearly in what follows, several characteristics differentiate the spray nozzles 40 from sprayers of the WRC type. The spray nozzles 40 are connected to two inlets of pressurised water flowing at different flow rates Q1 and Q2. They thus allow for the spraying of pressurised water according to three flow rates: Q1, Q2, Q1+Q2.

Such as is shown, such spray nozzles 40 have a main hollow body 51 of which one end is provided with a first perforated pressure-reducing wall 52 and with a second perforated pressure reducing wall 53 placed across from one another and parallel in relation to one another thus creating an intermediary chamber. The perforations arranged in the first pressure-reducing wall 52 and in the second pressure reducing wall 53 are distributed substantially uniformly at their surface. The density of perforations of the first pressure-reducing wall 52 is less than the density of perforations of the second pressure reducing wall 53. Moreover, the surface of the perforations arranged in the first pressure-reducing wall 52 is greater than the surface of the perforations arranged in the second pressure reducing wall 53. The values of the diameters of these perforations are between 1 and 15 millimeters.

Figure 5A:
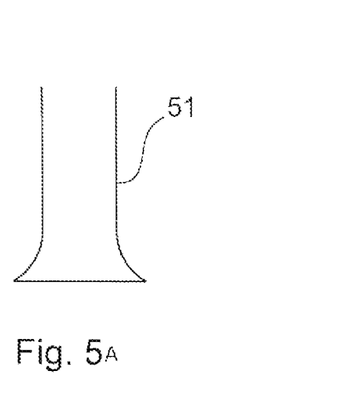
FIG. 5A shows an alternative of the lower outline that can have a nozzle shown in FIG. 5.

Moreover, the lower end of the main body 51 forms an angle γ in relation to the vertical. The value of this angle γ is between 0 and 20°. According to one alternative of the technique shown here, shown in FIG. 5A, the lower part of the main body 51 is curved. The fact that the main body 51 has a divergent form makes it possible to facilitate the spraying.

The main body 51 houses a secondary hollow body 54. This secondary hollow body 54 is able to be crossed by a first flow of pressurised water of flow rate Q1, while the main hollow body 51 is able to be crossed by a second flux of pressurised water of flow rate Q2 of a preferably higher value. This flow rate Q2 can also be of a lesser value in an alternative.

In this embodiment, each spray nozzle 40 is therefore connected to two distribution networks of pressurised water able to deliver respectively pressurised water at flow rate Q1 and at flow rate Q2. The means of producing pressurised water 42 are thus split (not shown) in such a way to make it possible to provide three flow rates Q1, Q2 and Q1+Q2 of pressurised water.

As shown in particular in FIGS. 3, 4, 5 and 6A, several rows 45 of a plurality of spray nozzles 40 can be arranged in parallel.

Figure 6:
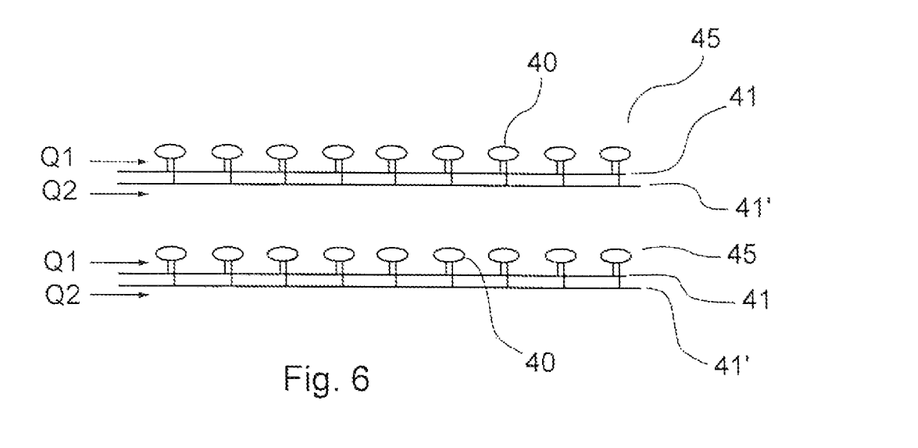

FIG. 6 is a diagram showing an example of architecture of a distribution network of pressurised water implementing two rows 45 of spray nozzles 40.

Such a network comprises two distribution networks of a flow rate Q1 of pressurised water and two distribution networks of a flow rate Q2 of pressurised water in such a way to implement two rows of spray nozzles.

As shown, each spray nozzle 40 of each row 45 is connected to the first distribution network of a flow rate Q1 of pressurised water by means of the pipe 41 and to the second distribution network of a flow rate Q2 of pressurised water by means of a pipe 41'.

Figure 6A:
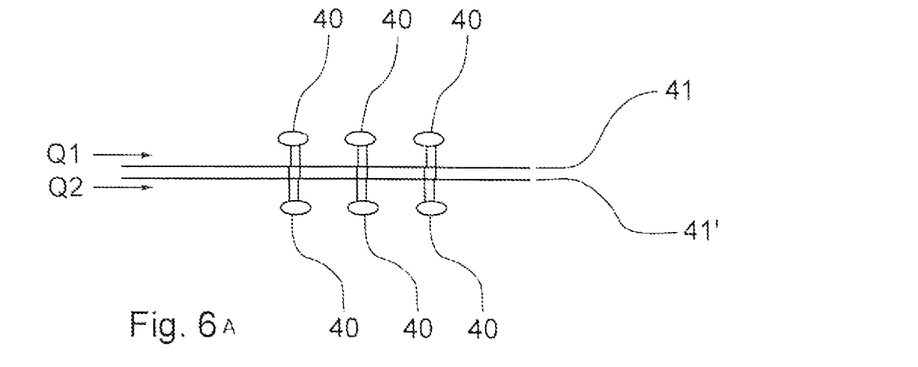

One alternative, shown in FIG. 6A, consists in implementing two rows of spray nozzles 40 without splitting the distribution networks Q1 and Q2.

A water treatment installation according to the technique shown here further comprises a scraper (not shown). As shall be explained in more detail in what follows, such a scraper makes it possible to remove the sludge, constituted of matter in suspension, organic matter, algae initially present in the raw water, floating in the upper part of the mixing 32 and flotation 35 zones, as well as the air bubbles introduces into the structure outside of the flotation zone (arrow 1) in the means of recovering 46.

Figure 7:
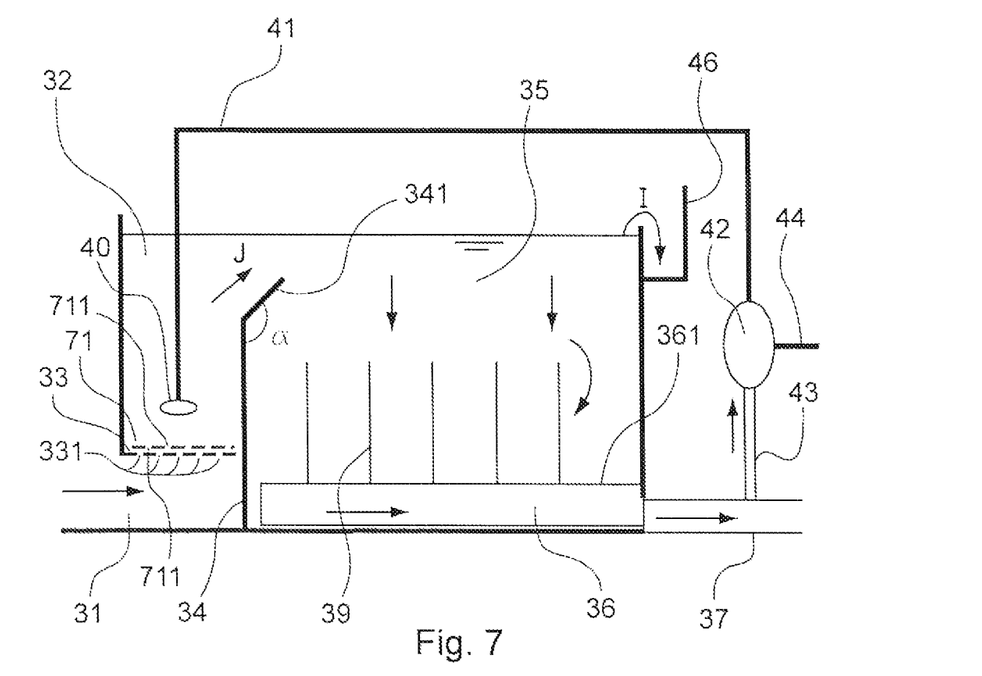
FIG. 7 shows a second embodiment of an installation for water treatment according to the invention that comprises a plate with holes interposed between the spray nozzles and the perforated panel.
Figure 8:
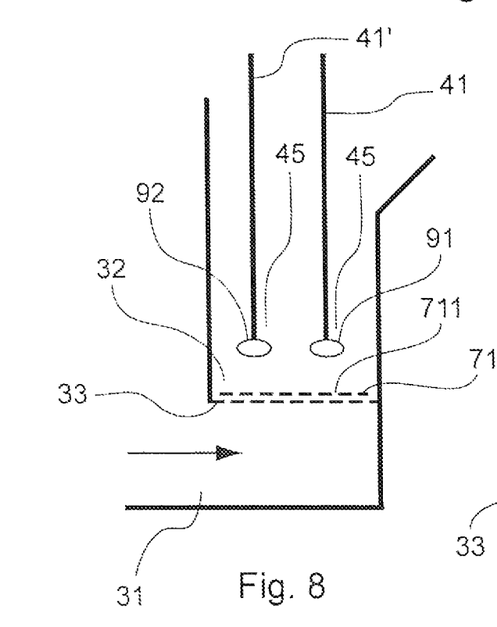
FIG. 8 is a partial view of an alternative of the installation in FIG. 7, wherein several rows of nozzles are implemented.
Figure 9:
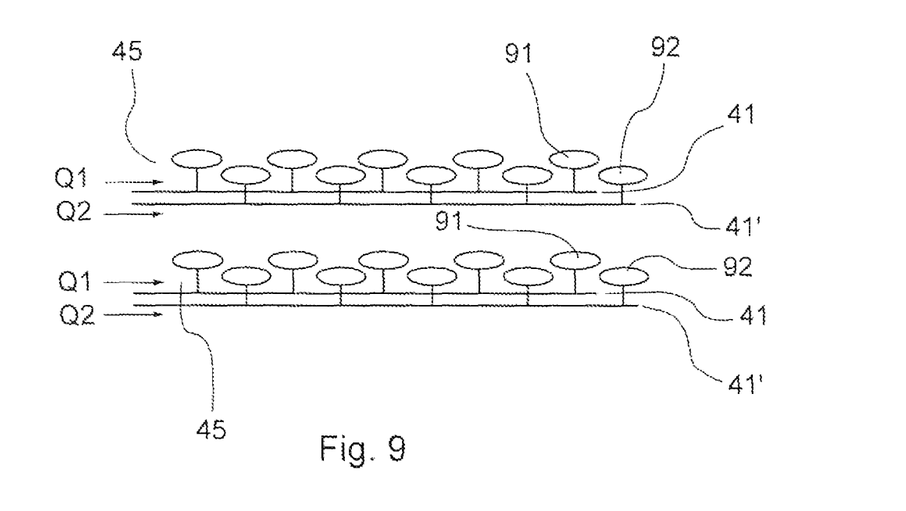
FIG. 9 shows an example of an architecture of a distribution network of pressurised water wherein nozzles of a first category are connected to a spray network of pressurised water according to a first flow rate and nozzles of a second category are connected to a spray network according to a second flow rate of pressurised water.

Example of a Second Embodiment of a Water Treatment Plant According to the Technique Shown Here In reference to FIGS. 7 to 9 a second embodiment of a water treatment installation according to the technique shown here is described.

In this second embodiment, the water treatment installation has a large number of characteristics that are common with those of the installation according to the first embodiment described hereinabove. Only the differences between the first and second embodiment shall be described here.

As shown in FIG. 7, a perforated plate 71, housed inside the mixing zone 32 downstream of the perforated panel 33, is implemented in this second embodiment. This perforated plate 71 is arranged in such a way that the interstices 711 that are arranged therein are across from solid parts of the perforated panel 33. In other words, the interstices 711 and the perforations 331 are not aligned, in such a way as to form baffles, such as is clearly shown in FIGS. 1 and 8.

The interstices crossing the perforated plate 71 can have a diameter between 2 and 50 centimeters. Moreover, the perforated panel 33 and the perforated plate 71 are advantageously separated by a distance between ⅓ of the diameter of the interstices 711 and 3 times the diameter of the interstices 711.

One or several spray nozzles 40 can be implemented in this second embodiment. Each spray nozzle 40 roust not necessarily be placed in the axis of an interstice 711.

In the same way as in the embodiment described hereinabove, an alternative of this embodiment can consist in implementing several rows 45 of spray nozzles 40, such as is shown in FIG. 8.

The spray nozzles implemented in this second embodiment can be similar to the spray nozzles 40 described hereinabove in relation with FIGS. 5 and 6.

In an alternative of this second embodiment, shown in FIG. 9, the spray nozzles are different from the spray nozzles 40 described hereinabove in that each of them is not connected to the first spraying network of pressurised water at a flow rate Q1 and to the second spraying network of pressurised water at a flow rate Q2. On the contrary, the spray nozzles implemented in this alternative of the second embodiment are separated into two categories:

spray nozzles 91 of a first category are each connected to the spray network of pressurised water at a flow rate Q1;
spray nozzles 92 of a second category are each connected to the spray network of pressurised water at a flow rate Q2.

These spray nozzles 91 and 92 can for example be of the WRC type or any other type in accordance worth the bubbling principle.

In another alternative, the nozzles 40 are all identical and spray at a single flow rate.

Figure 8A:
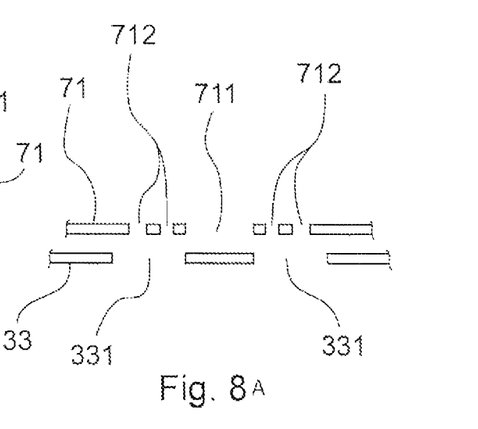
FIG. 8A shows another alternative of a plate forming a splash board.

In an alternative of this embodiment shown in FIG. 8A, the perforated plate can have two types of interstices: basic interstices and refining interstices 712.

The basic interstices are composed of the interstices 711 arranged in such a way that the perforated plate 71 comprises a splash board. The refining interstices 712 are arranged in the solid parts joining basic interstices 711 of the perforated plate 71. The implementation of these refining interstices 712 makes it possible to optimise the homogenisation of the water flow to be treated entering into the mixing zone 32.

The diameters of the basic interstices 711 and refining interstices 712 are chosen in such a way that the flow rate crossing the basic interstices 711 is equal to the flow rate crossing the refining interstices 712.

Water Treatment Method by Flotation According to the Technique Shown Here

A flotation water treatment method according to the technique shown here shall now be described.

Such a method consists in transiting the water to be treated into a water treatment installation according to one or the other of the embodiments described hereinabove.

The water to be treated which is coagulated and flocculated beforehand is directed towards the inlet zone of water 31. The water to be treated is then injected according to an ascending current into the mixing zone 32 by passing through the perforations 331 of the perforated panel 33.

At the same time, pressurised and then depressurised water is injected into the mixing zone 32, at counter-current of the ascending current of the water to be treated, by means of spray nozzles 40. As indicated hereinabove, it can be provided that the pressurised water be injected into the mixing zone at co-current.

The pressurised water is obtained, after activation of the means for producing pressurised water 42, using a portion of the clarified water which is removed from the flotation zone 35 and air coming from the source of air 44.

The pressurised, water flows in the conduit 41 to the spray nozzles 40. It first crosses the first pressure-reducing wall 52. The pressurised water then undergoes a strong loss of pressure and expands. The pressurised and then depressurised water then crosses the second pressure reducing wall 53 and undergoes a slight loss of pressure allowing it to be sprayed. This spraying phenomenon participates in preventing the strong shear rates on the spraying stage.

The spraying of the pressurised and then depressurised water into the mixing zone 32 is accompanied with the formation of micro air bubbles distributed homogenously over the entire horizontal section of the mixing zone 32.

The fact that the water to be treated is injected into the mixing zone 32 by crossing the perforated panel 33 makes it possible to homogenise and to fragment its flow by preventing the formation of short circuits, recirculation zones and dead zones. In other terms, the implementation of the perforated panel 33 makes it possible to provide homogenous contact and across the entire horizontal section of the mixing zone 32 of the wafer to be treated and of the micro air bubbles.

The homogenisation of the contact of the water to be treated and the micro air bubbles can be improved further when the plate with holes 71 is interposed between the perforated panel 33 and the spray nozzles.

Thus, the combination of the homogenisation of the flow of water to be treated, through the presence of the perforated panel, with the arrangement of the spray nozzles across from each perforation of the perforated panel, and/or with the implementation of the perforated plate forming a splash board, makes it possible to provide an optimal mixture between the water to be treated and the pressurised water.

The micro air bubbles have aim to bring towards the surface of the mixing zone 32 and of the flotation zone 35 all of the particles in suspension in the water to be treated. Thus, the fact that the contact between the water to be treated and the micro air bubbles is homogenous makes it possible to optimise the clarification of the water to be treated and to substantially improve the effectiveness of the treatment of the water by flotation.

The mixture constituted of the micro air bubbles whereon are agglomerated the particles that were initially in suspension in the water to be treated are then displaced towards the upper part of the flotation zone 35 such as is shown by the arrow J. This mixture can then be removed outside of the flotation zone 35 by means of the scraper (not shown) which makes it possible to scrape the surface of the flotation zone 35 in order to direct the sludge produced as well as air bubbles in the direction of the means of recovering 46 such as is shown by the arrow I.

The clarified water thus flows in the direction of the lower part of the flotation zone 35 which accommodates the chamber 36 and meets the partitions 39. The flow of the clarified water is fragmented by these partitions 39.

The implementation of these partitions 39, due to the fact that they allow the flow of clarified water to be fragmented inside the flotation zone 35, makes it possible to prevent the appearance of a recirculation loop in the vicinity of the clarified-water take-up zone.

This is clearly shown in FIG. 10 which shows the speed vectors of the flow of liquid 101 inside the flotation zone 35.

A comparison of FIGS. 2 and 10, which show respectively the speed vectors of the liquid inside a flotation zone of an installation according to prior art and of an installation according to the technique shown here, makes it possible to better apprehend the modifications of the flow of liquid which result from the implementation of partitions 39 in the flotation zone 35.

It is clearly shown in FIG. 2 that the speed vectors 21 are concentrated into a vortex at the centre of the flotation zone. This vortex creates a recirculation loop phenomenon and directs the clarified water in the direction of the upper part of the flotation zone, portion wherein it mixes with the bed of micro bubbles.

On the contrary, it appears clearly in FIG. 10 that the speed vectors of the liquid break against the partitions 39 and that the speed vectors located between these partitions 39 are not disturbed, i.e. they do not rise in the direction of the upper part of the flotation zone.

The implementation of such partitions 39 thus makes it possible to prevent the recirculation loop phenomenon in the lower part of the flotation zone, wherein is located the chamber 36 allowing for the taking up of the clarified water, and therefore to prevent, or at the very least limit, the departure of micro air bubbles with the clarified water.

The implementation of partitions 39 makes it possible to prevent the departure of bubbles and sludge towards the taking up in of clarified water and therefore to prevent the clarified water collected from being dirtied by micro air bubbles loaded with particles.

The technique according to the invention therefore makes it possible to optimise the clarification of the water by flotation and to improve the quality of the clarified water collected at the end of the flotation treatment.

Moreover, the method according to the invention can also include a step consisting in choosing the value of the flow rate of the pressurised water injected into the mixing zone. The choice of the value of the flow rate of the pressurised water can be linked to the flow rate of the water to be treated and/or to the quality of the water to be treated. Indeed, if the flow rate of the water to be treated varies in proportions from 1 to 4, and/or if the quality of the water to be treated changes, it is interesting, in particular from an economic standpoint, to be able to vary in the same proportions the flow rate of the pressurised water.

As such, when tine flow rate of the water to be treated is rather low and/or the quality of the water to be treated is relatively good, the means of producing pressurised water according to the flow rate Q1 will be activated.

When the flow rate of the water to be treated increases and/or when the quality of the water to be treated is degraded, the means of producing pressurised water according to the flow rate Q2 will be activated, or all of the means of producing can be implemented so as to provide a flow rate equal to the sum of Q1 and Q2.

The invention claimed is:

1. A method removing suspended particles in water through a flotation process, the method comprising:
   directing the water to be treated having the suspended particles into an inlet area;
   directing the water to be treated from the inlet area into a mixing zone;
   pressurizing the water and directing the pressurized water to a series of spray nozzles disposed in the mixing zone and ejecting the pressurized water from the series of spray nozzles into the mixing zone causing air bubbles to be formed and mixed with the water to be treated in the mixing zone;
   directing the pressurized water to the series of nozzles includes directing the pressurized water to a network that includes a first distribution network for directing the pressurized water to one or more spray nozzles at a first flow rate and a second distribution network for directing pressurized water to one or more spray nozzles at a second flow rate;
   directing the water in the mixing zone along with the suspended particles to a flotation zone where the air bubbles are effective to cause the suspended particles to float in an upper level of the flotation zone where the suspended particles can be removed;
   collecting clarified water in a clarified water collection area;
   providing a generally homogeneous mixture of the water and the pressurized water in the mixing zone by directing the water to be treated from the inlet area through a perforated plate having an array of openings therein which separates the inlet area from the mixing zone such that water to be treated moving from the inlet area to the mixing zone passes through the array of openings in the perforated plate, resulting in a generally homogeneous mix of the water to be treated with the pressurized water in the mixing zone; and
   wherein there is provided a clarified water take-up zone about the lower portion of the flotation zone, and the method includes generally preventing the occurrence of a recirculation phenomenon in the clarified water take-up zone.

2. The method of claim 1, wherein substantially all of the water to be treated is constrained to move through the perforated plate having the array of openings as the water moves from the inlet area to the mixing zone.

3. The method of claim 1 including orienting the series of spray nozzles in the mixing zone such that the ejected pressurized water from the series of spray nozzles is directed counter or co-currently with respect to the water to be treated that moves through the mixing zone.

4. The method of claim 1 including partitioning the clarified water take-up zone so as to generally prevent the occurrence of the recirculation phenomenon.

5. The method of claim 1 wherein at least a portion of the pressurized water is sourced from the clarified water collection area.

6. The method of claim 1 wherein each of the series of spray nozzles includes two inlets and the method includes directing one stream of pressurized water to one inlet and directing another stream of pressurized water to the other inlet, and wherein the flow rates of the two pressurized streams are different.

7. The method of 1 wherein the pressurized water is ejected in the mixing zone such that the ejected pressurized water is initially ascending.

8. The method of 1 wherein the pressurized water is ejected in the mixing zone such that the ejected pressurized water is initially descending.

9. The method of claim 1 wherein the mixing zone is disposed over the inlet area, and wherein the perforated plate is generally horizontally disposed between the inlet area and the mixing zone;
   wherein there is provided a partition that generally separates the mixing zone from the flotation zone; and
   wherein the clarified water collection area is disposed below a substantial portion of the flotation zone.

10. The method of claim 1 including directing the water to be treated from the inlet area through a pair of spaced apart perforated plates where one perforated plate overlies the other perforated plate.

11. The method of claim 10 wherein perforations in the two perforated plates are not aligned and the method includes directing the water to be treated through the non-aligned perforations in the two perforated plates.

12. A method of removing suspended particles in water through a flotation process comprising:
   directing the water to be treated having the suspended particles into an inlet area;
   directing the water to be treated from the inlet area upwardly through a perforated plate into a mixing zone and, once in the mixing zone, directing the water upwardly through the mixing zone;

directing pressurized water to a series of nozzles in the mixing zone and ejecting pressurized water along with air bubbles from the spray nozzles and mixing the ejected pressurized water and air bubbles with the water to be treated in the mixing zone, wherein the air bubbles engage the suspended particles and move the suspended particles upwardly in the mixing zone;

directing the water in the mixing zone along with the suspended particles and air bubbles to a flotation zone disposed to one side of the mixing zone where the air bubbles are effective to cause the suspended particles to float in the upper portion of the flotation zone where the suspended particles can be removed;

collecting clarified water in a clarified water collection area; and directing the pressurized water to the series of nozzles includes directing the pressurized water to a network that includes a first distribution network for directing the pressurized water to one or more spray nozzles at a first flow rate and a second distribution network for directing pressurized water to one or more spray nozzles at a second flow rate.

13. The method of claim 12 including directing the pressurized water upwardly through the mixing zone such that the pressurized water, air bubbles and the water to be treated flow upwardly in a co-current fashion.

14. The method of claim 12 wherein there is provided the series of spray nozzles in the mixing zone and the method includes aligning the series of spray nozzles with the perforations in the plate.

15. The method of claim 12 including breaking up the flow of water in the lower portion of the flotation zone with a series of partitions disposed in the lower portion of the flotation zone and generally preventing the recirculation of water in the lower portion of the flotation zone.

16. The method of claim 12 including directing the pressurized water out through at least two pressure reducing walls formed in the spray nozzles.

17. A method removing suspended particles in water through a flotation process, the method comprising:
   directing the water to be treated having the suspended particles into an inlet area;
   directing the water to be treated from the inlet area into a mixing zone;
   pressurizing the water and directing the pressurized water to one or more spray nozzles disposed in the mixing zone and ejecting the pressurized water from the one or more spray nozzles into the mixing zone causing air bubbles to be formed and mixed with the water to be treated in the mixing zone;
   directing the water in the mixing zone along with the suspended particles to a flotation zone where the air bubbles are effective to cause the suspended particles to float in an upper level of the flotation zone where the suspended particles can be removed;
   collecting clarified water in a clarified water collection area;
   providing a generally homogeneous mixture of the water and the pressurized water in the mixing zone by directing the water to be treated from the inlet area through a perforated plate having an array of openings therein which separates the inlet area from the mixing zone such that water to be treated moving from the inlet area to the mixing zone passes through the array of openings in the perforated plate, resulting in a generally homogeneous mix of the water to be treated with the pressurized water in the mixing zone; and
   wherein each of the one or more spray nozzles includes two inlets and the method includes directing one stream of pressurized water to one inlet and directing another stream of pressurized water to the other inlet, and wherein the flow rates of the two pressurized streams are different.

18. The method of claim 17 including orienting the one or more spray nozzles in the mixing zone such that the ejected pressurized water from the one or more spray nozzles is directed counter or co-currently with respect to the water to be treated that moves through the mixing zone.

19. The method of claim 17 wherein the mixing zone is disposed over the inlet area and wherein the perforated plate is generally horizontally disposed between the inlet area and the mixing zone; wherein there is provided a partition that generally separates the mixing zone from the flotation zone; and wherein the clarified water collection area is disposed about the bottom of the flotation zone.

20. The method of claim 17 including directing the water to be treated from the inlet area through a pair of spaced apart perforated plates where one perforated plate overlies the other perforated plate.

* * * * *